United States Patent [19]

Katagiri et al.

[11] 3,929,546
[45] Dec. 30, 1975

[54] COLLAPSIBLE TIRE BUILDING DRUM

[75] Inventors: Yoshiaki Katagiri, Kodaira; Takao Urayama, Higashimurayama; Masaji Mori, Kurume, all of Japan

[73] Assignees: Bridgestone Tire Company Limited, Tokyo; Mori Ironworks Company Limited, Kurume, both of Japan

[22] Filed: Dec. 4, 1973

[21] Appl. No.: 421,632

[30] Foreign Application Priority Data
Dec. 7, 1972  Japan............................. 47-122829

[52] U.S. Cl............. 156/417; 308/6 R; 308/DIG. 7
[51] Int. Cl.[2].......................................... B29H 17/16
[58] Field of Search .......... 156/414, 415, 416, 417, 156/418–420; 312/341 NR; 308/DIG. 7, 6 R

[56] References Cited
UNITED STATES PATENTS

| 2,916,226 | 12/1959 | McGraw, Jr. ................. 308/DIG. 7 |
| 3,121,651 | 2/1964 | Borglin et al. .................. 156/417 X |
| 3,140,216 | 7/1964 | Shilts et al. ......................... 156/417 |
| 3,178,331 | 4/1965 | Bishop et al. .................. 156/417 X |
| 3,185,530 | 5/1965 | Reiss et al. .................... 312/341 NR |
| 3,207,648 | 9/1965 | Shilts .............................. 156/417 X |
| 3,322,599 | 5/1967 | Bishop .............................. 156/417 |
| 3,418,192 | 12/1968 | Nadler .......................... 156/417 X |
| 3,442,747 | 5/1969 | Brey .................................. 156/417 |
| 3,485,306 | 12/1969 | Gulley.............................. 308/6 R |
| 3,817,812 | 7/1974 | Yabe................................. 156/417 |
| 3,851,911 | 12/1974 | Brooks.............................. 293/84 |

FOREIGN PATENTS OR APPLICATIONS
879,360  10/1961  United Kingdom............ 308/DIG. 7

OTHER PUBLICATIONS
Modern Plastics Encyclopedia, 1967, Sept. 1966, Vol. 44, No. 1A of Modern Plastics, McGraw–Hill, N.Y.
Modern Plastics Encyclopedia, 1972, Oct. 1972, Vol. 49, No. 10A of Modern Plastics, McGraw–Hill Co., N. Y. City.

Primary Examiner—Douglas J. Drummond
Assistant Examiner—John E. Kittle
Attorney, Agent, or Firm—Waters, Schwartz & Nissen

[57]  ABSTRACT

This specification discloses a collapsible tire building drum which includes elements made of a light metal such as aluminium and duralumin and combined with one another while providing no frictional contact between the elements by means of guide rods made of a synthetic resin.

5 Claims, 9 Drawing Figures

COLLAPSIBLE TIRE BUILDING DRUM

The present invention relates in general to the art of pneumatic tire manufacture and, in particular, is concerned with a tire building drum for manufacturing a carcass structure for a green tire.

As is well known in the art, several tire components are first wrapped on the working surface of a tire building drum for the purpose of building carcass portion of the uncured tire into a generally cylindrical form, whereupon the building drum can be collapsed to permit removal of the carcass structure which has been formed thereupon. Each of the tire components wrapped on the tire building drum has such a length so that the two ends of each tire component overlap each other to thereby form a "junction". In order to obtain a pneumatic tire of high quality and desired performance characteristics, the tire components are wrapped on the tire building drum in such a manner that the junctions formed by the respective tire components located substantially equidistantly from one another, which is referred to as "balanced wrapping" in the present specification. In order to be able to perform the balanced wrapping, the tire building drum should be intermittently rotated through desired angles, while successively wrapping the tire components thereon.

In this instance, a problem lies in that, since the conventional tire building drum is made of steel and accordingly has such a large inertia as to necessitate a complicated and large-scaled brake system, in order to desirably move or stop the building drum, the overall apparatus becomes inevitably costly.

It is, accordingly, a principal object of the present invention to provide a new and improved tire building drum of such a small inertia as to be readily rotated through a desired angle.

It is another object of the present invention to provide a new and improved tire building drum which has a sufficiently long life span.

According to the present invention, it has been found that the above objects are achieved by a collapsible tire building drum which comprises a rotary shaft for rotating the building drum, a pair of flange members made of a light metal and which are fixedly mounted on the rotary shaft in facing and spaced relationship with each other. Each of said flange members has a plurality of radially extending small grooves on its side surface facing the opposite flange member, and a conical cam member made of the light metal and slidably mounted on the rotary shaft between the pair of flange members. The conical cam member has on its peripheral wall thereof, a plurality of axially extending and steeply tapered grooves and a plurality of axially extending and gently tapered grooves, each of which is interposed between the adjacent two of the steeply tapered grooves, the conical cam member having a plurality of pairs of small grooves, at least one pair of which are respectively formed on the side walls of each of the steeply tapered grooves and gently tapered grooves, a first group of segments made of the light metal, each of the first group of segments having at least one pair of small grooves respectively formed on its side walls. The small grooves of the first group of segments respectively face alternate ones of the small grooves of the flange members so as to define first guide rod bores, each of the first group of segments having one on its inner wall an axially extending and steeply tapered inner projection slidably engaged with one of the steeply tapered guide grooves of the conical cam member. The inner projection has at least one pair of small grooves respectively formed on its side walls, each of the last-mentioned one pair of small grooves facing each of the at least one pair of small grooves of each steeply tapered groove so as to define a pair of second guide rod bores, a second group of segments made of the light metal and interposed between the adjacent two of the first group of segments, each of the second group of segments having at least one pair of small grooves respectively formed on its side walls, the small grooves of the second group of segments respectively facing the remaining small grooves of the flange members so as to define third guide rod bores. Each of the second group of segments has on its radially inner wall an axially extending and gently tapered inner projection slidably engaged with one of the gently tapered guide grooves of the conical cam member, the inner projection of each of the second group of segments having at least one pair of small grooves respectively formed on its side walls, each of the at least one pair of small grooves facing each of the at least one pair of small grooves of each gently tapered grooves so as to define a pair of fourth guide rod bores, and a plurality of guide rods respectively slidably accommodated in the first, second, third and fourth guide rods.

For a full understanding of the invention, a detailed description in a preferred form will now be given in connection with the accompanying drawings and the features forming the invention will be specifically pointed out in the claims.

In the drawings:

FIG. 2a is a view taken along the line A-A shown in FIG. 1a;

FIG. 6 is an enlarged view taken along the line C—C shown in FIG. 1a; and

FIG. 7 is an enlarged view taken along the line D—D shown in FIG. 1a.

In the drawings, like reference numerals are intended to refer to idential or similar elements throughout the several views.

Figure 3:
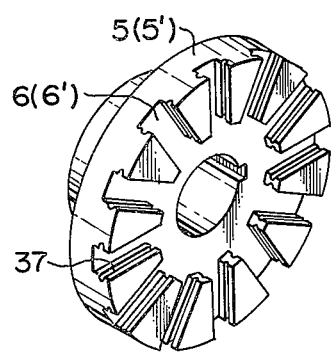
FIG. 3 is a schematic view of a flange member of the tire building drum of FIGS. 1a and 1b.
Figure 4:
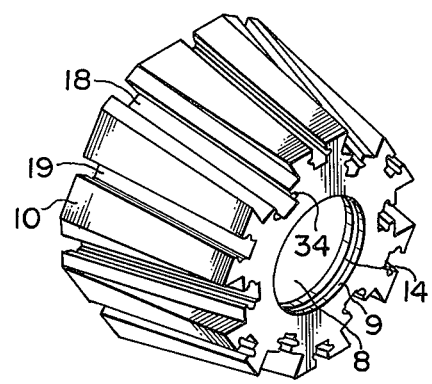
FIG. 4 is a schematic view of a conical cam member of the tire building drum of FIGS. 1a and 1b.
Figure 5:
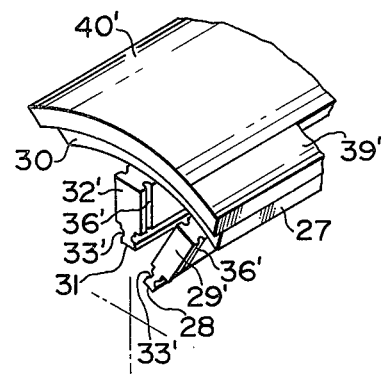
FIG. 5 is a schematic view of adjacent two of segments of the collapsible tire building drum of FIGS. 1a and 1b.

Referring now to the drawings, there is shown a collapsible tire building drum according to the present invention, which comprises a rotary shaft 1 connected by way of a flange 2 to a driving shaft (not shown). A pair of flange members 5 and 5' are fixedly mounted on the rotary shaft 1 by means of key members 3 and 3' and snap rings 4 and 4'. As clearly seen from FIG. 3, each of the flange members 5 and 5' has a plurality of radially extending guide grooves 6 on its side surface facing the opposite flange member. A conical cam member 7 includes a concave conical member 10 which is slidably mounted through its central bore 9 on the rotary shaft 1 between the flange members 4 and 4', and a cap member 13 slidably mounted through its central bore 12 on the rotary shaft 1 and capping the concaved portion of the concave conical member 10 to thereby define a chamber which is separated into a pair of chambers 8 and 11 by means of a separating plate 20. The plate 20 is slidably accommodated in the concave conical member 10 and has a central bore 21 hermetically coupled with the rotary shaft by means of, for example, a snap ring 22. The concave conical member 10 has formed in its peripheral wall a group of axially extending and steeply tapered grooves 18 and another group of axially extending and gently tapered grooves 19 each of which is interposed between the adjacent two of the steeply tapered grooves 18, as may be clearly seen from FIG. 4. The bores 9 and 12, respectively, have in their inner walls circumferentially extending grooves 14 and 15 in which O-rings 16 and 17 are respectively accommodated so as to hermetically seal the chamber defined by the concave conical member 10 and the cap member 13. The separating plate 20 has, on its peripheral wall, a circumferentially extending groove 23 in which a O-ring 24 is accommodated so as to hermetically separate the chambers 8 and 11. In the rotary shaft 1 there is formed an axially extending conduit 25 having one end opened to the chamber 8 and the other end opened at one end of the rotary shaft 1. Another conduit 26 is formed in the rotary shaft 1, having one end opened to the chamber 11 and the other end opened at the same end of the rotary shaft 1 as conduit 25. The conical cam member 7 is reciprocated between such positions, as respectively shown in FIGS. 1a and 1b, by alternately applying pressurized air to the conduits 25 and 26. As is clearly seen from FIG. 5, the peripheral wall of the building drum is separated into a first group of segments 27 and a second group of segments 30 which are interposed between the adjacent two of the first group of segments 27. Each of the segments 27 has on its radially inner wall an axially extending and steeply tapered projection 28 which is engaged with one of the steeply tapered groove 18 of the concave conical member 10. Each of the segments 27 further has on both of its side walls a pair of radially extending side projections 29 and 29' which are respectively slidably engaged with the guide grooves 6 and 6' of the flange members 5 and 5'. Each of the segments 30 has on its radially inner wall an axially extending and gently tapered projection 31 which is engaged with each one of the gently tapered grooves 19 of the concave conical member 10. Each of the segments 28 further has on both side walls thereof a pair of radially extending side projections 32 and 32' which are, respectively, slidably engaged with the guide grooves 6 and 6' of the flange members 5 and 5'.

Figure 6:
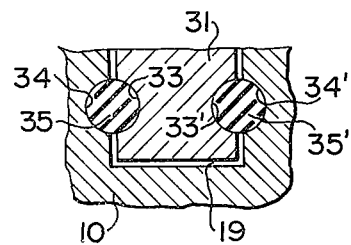
Figure 7:
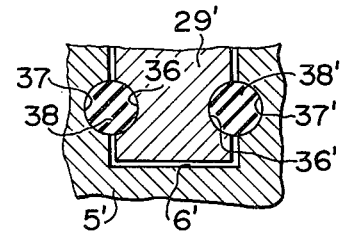

As seen from FIG. 6, each of the inner projections 28 and 31 of the segments 27 and 30 has a pair of small grooves 33 and 33' which are respectively formed on the side walls thereof, and the conical member 10 has a plurality of pairs of small grooves 34 and 34' each pair of which are respectively formed on the side walls of each of the grooves 18 and 19 in such a manner as to, respectively, define a pair of bores of preferably circular cross section which are in cooperation with the small grooves 33 and 33'. A pair of guide rods 35 and 35' are alidably accommodated in the bores defined by the small grooves 33 and 34 and 33' and 34'. The guide rods 35 and 35' are made of a synthetic resin including a polyfluoroethylene, such as ethylene tetrafluoride. As seen from FIG. 7, each of the side projections 29, 29', 32 and 32' has a pair of small grooves 36 and 36' on its side walls, and each of the flange members 5 and 5' has a plurality of pairs of small grooves 37 and 37' each pair of which are respectively formed on the inner side walls of each of the guide grooves 6 and 6' in such a manner as to respectively define a pair of bores of preferably circular cross section together with the small grooves 36 and 36'. A pair of guide rods 38 and 38' preferably made of the same material as the guide rods 35 and 35' are respectively slidably accommodated in the bores defined by the small grooves 37, 38 and 37', 38'. It is now noted that there is no contact between the projections 31 etc. and the grooves 19 etc. and between the projections 29' etc. and 6' etc., as may be clearly seen from FIGS. 6 and 7. A plurality of pairs of arcuate members 39 and 39', each pair of which sandwich a width adjusting members 41, are mounted on the peripheral walls of the segments 27, respectively. A plurality pairs of arcuate members 40 and 40', each pair of which sandwich a width adjusting members 41, are mounted on the peripheral walls of the segments 30.

It is, in this instance, noted that since the flange members 5 and 5', the conical cam member 7, the first and second groups of segments 27 and 30, the arcuate segments 39, 39' and 40, 40', etc. are made of a light metal of a specific gravity smaller than about 2.8, such as, aluminium and duralumin, the tire building drum of the present invention has an extremely small inertia.

The operation of the building drum mentioned above will be explained hereinbelow.

Figure 1A:
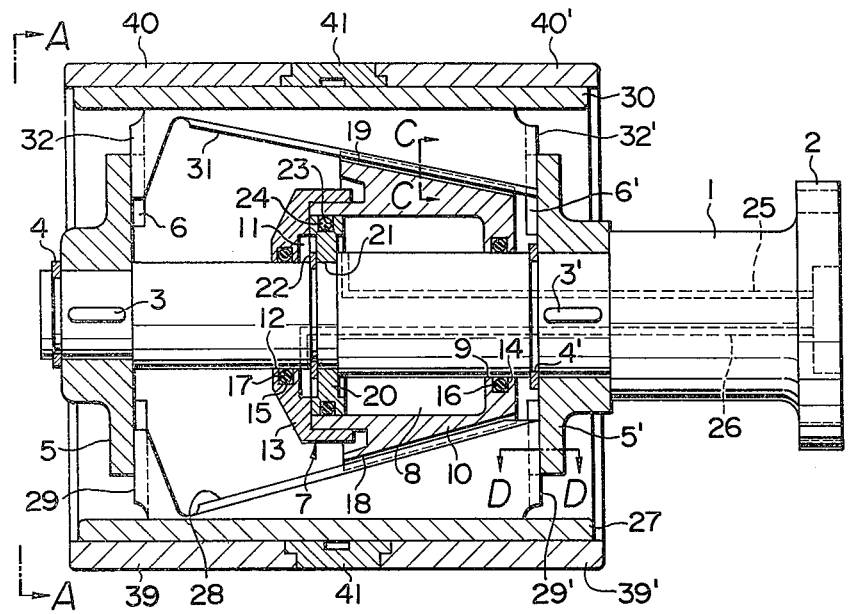
FIGS. 1a and 1b are longitudinal sectional views of a collapsible tire building drum according to the present invention.
Figure 1B:
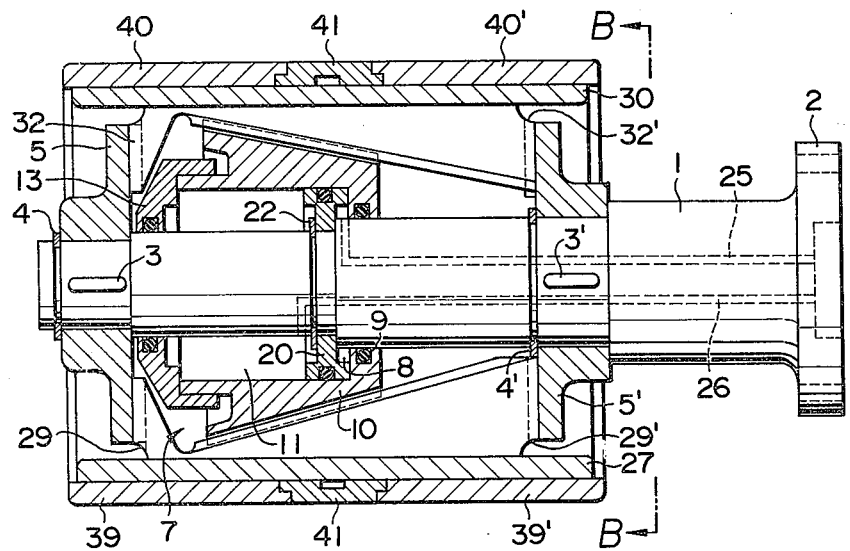
Figure 2A:
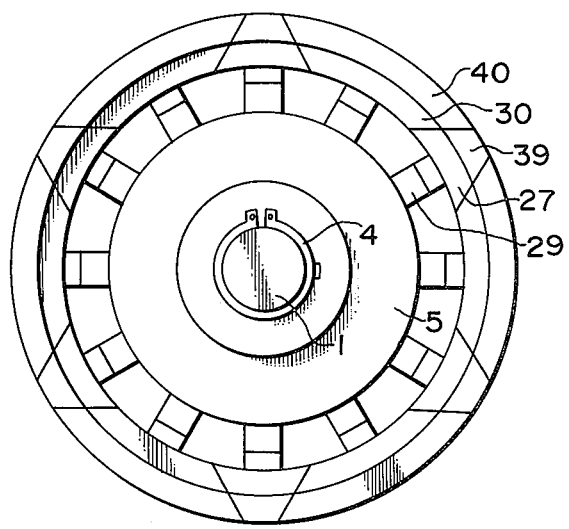
Figure 2B:
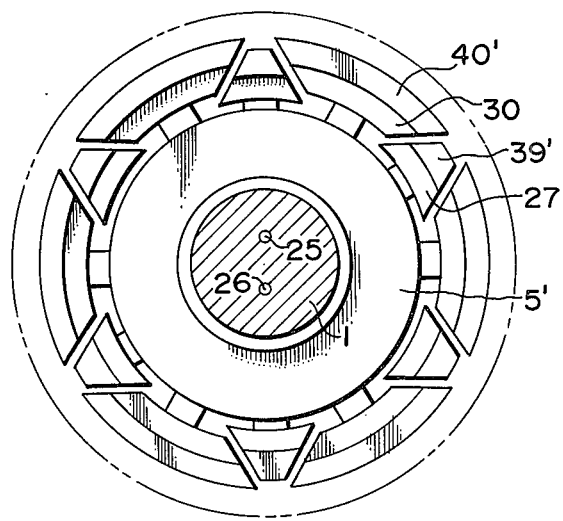
FIG. 2b is a view taken along the line B-B shown in FIG. 1b.

When the conical cam member 7 takes a position as shown in FIG. 1a, the building drum is in the expanded state. When, thereafter, pressurized air is supplied to the chamber 11 by way of the conduit 26 and the air in the chamber 8 is exhausted by way of the conduit 25, the conical cam member 7 moves to a position as shown in FIG. 1b, so that the first group of segments 27 moves radially inwardly and simultaneously because of the engagement between the steeply tapered grooves 18 and the steeply tapered inner projections 28, while the segments 27 are respectively guided by the guide grooves 6 and 6' of the flange members 5 and 5'. At the same time, the second group of segments 30 moves radially inwardly and simultaneously at a relatively low speed because of the engagement between the gently tapered grooves 19 and the gently tapered inner projections 31, while the segments 30 are respectively guided by the guide grooves 6 and 6' of the flange members 5 and 5'. Thus the building drum is located in the retracted state. While maintaining the retracted state of the building drum, a selected number of tire components of desired length are successively wrapped on the working surface of the building drum in such a manner as to perform the balanced wrapping. Thereafter, pressurized air is supplied to the chamber 8 by means of the conduit 25 so as to slide the conical cam member 7 on the rotary shaft 1 until the conical cam member 7 returns to the position shown in FIG. 1a, whereby the building drum expands. While maintaining the expanded state of the building drum, the tire components, which are wrapped on the building drum, are processed so as to form a carcass structure for a green tire. Upon completion of the process of forming the carcass structure, the building drum is again retracted by applying pressurized air to the chamber 11 while exhausting the air from the chamber 8 so as to permit removal of the resultant carcass structure. The above-stated process will be repeated in order to successively manufacture a plurality of carcass structures.

It should be now appreciated that since inner and side projections of the segments 27 and 30 respectively slide on the guide rods 35, 35', 38 and 38' without contacting the corresponding guide grooves, all the elements made of the light metal do not undesirably wear and, accordingly, the building drum has a sufficiently long life span although the light metal is susceptible to friction.

It is now noted that each flange member may have at least one pair of small grooves on the bottom wall of each one of the guide grooves thereof, although each flange member of the above-mentioned embodiment has at least one pair of small grooves on the inner side wall of each guide groove thereof. In this case, each side projection of each segment should have at least one radially extending small grooves on its axial side wall confronting the bottom wall of the guide groove. Further, each flange member may have merely a plurality of radially extending small grooves without having the guide grooves and, in this case, each segment has at least one pair of axially extending small grooves on both side surfaces thereof without having the side projections.

It should be appreciated that the guide rods incorporated in the building drum of the present invention can be readily replaced by new ones when they wear. Since, in addition, dove-tail engagement can be provided by the guide rods and thus is not required in the building drum of the present invention, so that the building drum of the invention can be manufactured at a relatively low cost.

The detailed description of the preferred embodiment of the invention for the purpose of explaining the principles thereof is not to be considered as limiting or restriction the invention, as many modifications may be made by the exercise of skill in the art without departing from the spirit of the invention.

What is claimed is:

1. A collapsible tire building drum for manufacturing a carcass structure for a green tire, which comprises:
   a rotary shaft for rotating said building drum;
   a pair of flange members made of light metal and fixedly mounted on said rotary shaft in facing and spaced relationship with each other, each of said flange members having a plurality of radially extending guide grooves on its side surface facing the opposite flange member, each of said flange members having at least one pair of radially extending small grooves respectively formed on the inner side walls of each of said guide grooves;
   a conical cam member made of said light metal and slidably mounted on said rotary shaft between said pair of flange members, said conical cam member having on its peripheral wall a plurality of axially extending and steeply tapered grooves and a plurality of axially extending and gently tapered grooves each of which is interposed between the adjacent two of said steeply tapered grooves, said conical cam member having a plurality of pairs of axially extending small grooves at least one pair of which are respectively formed on the side walls of each of said steeply tapered grooves and gently tapered grooves;
   a first group of segments made of said light metal, each of said first group of segments having on its both side walls at least one pair of radially extending side projections to be respectively slidably engaged with said guide grooves of said flange members, each of said projection having at least one pair of radially extending small grooves respectively formed on its side walls, said small grooves of said first group of segments respectively facing alternate ones of said small grooves of said flange members so as to define first guide rod bores, each of said first group of segments having on its radially inner wall an axially extending and steeply tapered inner projection slidably engaged with one of said steeply tapered grooves of said conical cam member, said inner projection having at least one pair of axially extending small grooves respectively formed on its side walls, each of said at least one pair of small grooves facing each of said at least one pair of small grooves of each steeply tapered groove so as to define a pair of second guide rod bores;
   a second group of segment made of said light metal and interposed between the adjacent two of said first group of segments, each of said second group of segments having on its both side walls at least one pair of radially extending side projections to be respectively slidably engaged with said guide grooves of said flange members, each of said projections having at least one pair of radially extending small grooves respectively formed on its side walls, said small grooves of said second group of segments respectively facing the remaining small grooves of said flange members so as to define third guide rod bores, each of said second group of segments having on its radially inner wall an axially extending and gently tapered inner projection slidably engaged with one of said gently tapered grooves of said conical cam member, said inner projection of each of said second group of segments having at least one pair of axially extending small grooves respectively formed on its side walls, each of said at least one pair of small grooves facing each of said at least one pair of small grooves of each gently tapered groove so as to define a pair of fourth guide rod bores;
   a plurality of guide rods respectively slidably accommodated in said first, second, third and fourth guide rod bores to provide respective small gaps between said projections and said grooves, each of said guide rods having a circular cross-section and being made of synthetic resin; and
   a conical cam member sliding means for sliding said conical cam member toward and away from alternate one of said flange members along said rotary shaft to collapse and expand said tire building drum.

2. A collapsible tire building drum as claimed in claim 1, in which said synthetic resin is a polyfluoroethylene.

3. A collapsible tire building drum as claimed in claim 2, in which said polyfluoroethylene is polytetrafluoroethylene.

4. A collapsible tire building drum as claimed in claim 1, in which said light metal is a metal of a specific gravity smaller than about 2.8.

5. A collapsible tire building drum as claimed in claim 4, in which said light metal is made of aluminum and alloy containing aluminum.

* * * * *